United States Patent
Lai et al.

(10) Patent No.: US 6,684,284 B1
(45) Date of Patent: Jan. 27, 2004

(54) CONTROL CHIPSET, AND DATA TRANSACTION METHOD AND SIGNAL TRANSMISSION DEVICES THEREFOR

(75) Inventors: Jiin Lai, Taipei (TW); Chau-Chad Tsai, Taipei (TW); Sheng-Chang Peng, Taipei (TW); Chi-Che Tsai, Kaohsiung Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 436 days.

(21) Appl. No.: 09/718,811

(22) Filed: Nov. 22, 2000

(30) Foreign Application Priority Data

Dec. 15, 1999 (TW) .......................................... 88121972 A (51) Int. Cl.[7] .............................. G06F 9/44; G06F 13/00
(52) U.S. Cl. ........................ 710/305; 710/306; 710/52; 709/101
(58) Field of Search ................................ 710/305, 310, 710/52, 56, 100, 306; 712/32; 361/679, 683; 370/489; 711/100; 709/101

(56) References Cited

U.S. PATENT DOCUMENTS

| | | | |
|---|---|---|---|
| 5,867,672 A | * | 2/1999 | Wang et al. |
| 5,867,724 A | * | 2/1999 | McMahon |
| 6,209,068 B1 | * | 3/2001 | Hill et al. |
| 6,230,228 B1 | * | 5/2001 | Eskandari et al. |
| 6,340,897 B1 | * | 1/2002 | Lytle et al. |
| 6,385,676 B1 | * | 5/2002 | Adkisson |

* cited by examiner

Primary Examiner—Gopal C. Ray
(74) Attorney, Agent, or Firm—J.C. Patents (57) ABSTRACT

A data transaction method between control chips. Data buffers of the control chips of the control chipset have fixed size and amount. In addition, read/write acknowledge commands are asserted in sequence according to read/write commands, by which the control chips can detect the status of the buffers within another control chips. When a control chip asserts a command, the corresponding data must be ready in advance. Therefore, the signal line for providing the waiting status, data transaction cycle and stop/retry protocol can be omitted. Accordingly, commands or data can be continuously transmitted without waiting, stop or retry, the performance is improved.

10 Claims, 7 Drawing Sheets

CONTROL CHIPSET, AND DATA TRANSACTION METHOD AND SIGNAL TRANSMISSION DEVICES THEREFOR

CROSS-REFERENCE TO RELATED APPLICATION

This application claims the priority benefit of Taiwan application serial no. 88121972, filed Dec. 15, 1999.

BACKGROUND OF THE INVENTION

1. Field of Invention

The present invention relates to a bus transaction method, and more particularly, relates to a data transaction method between the control chipsets in a computer system and an arbitration method between the control chipsets.

2. Description of Related Art

Figure 1:
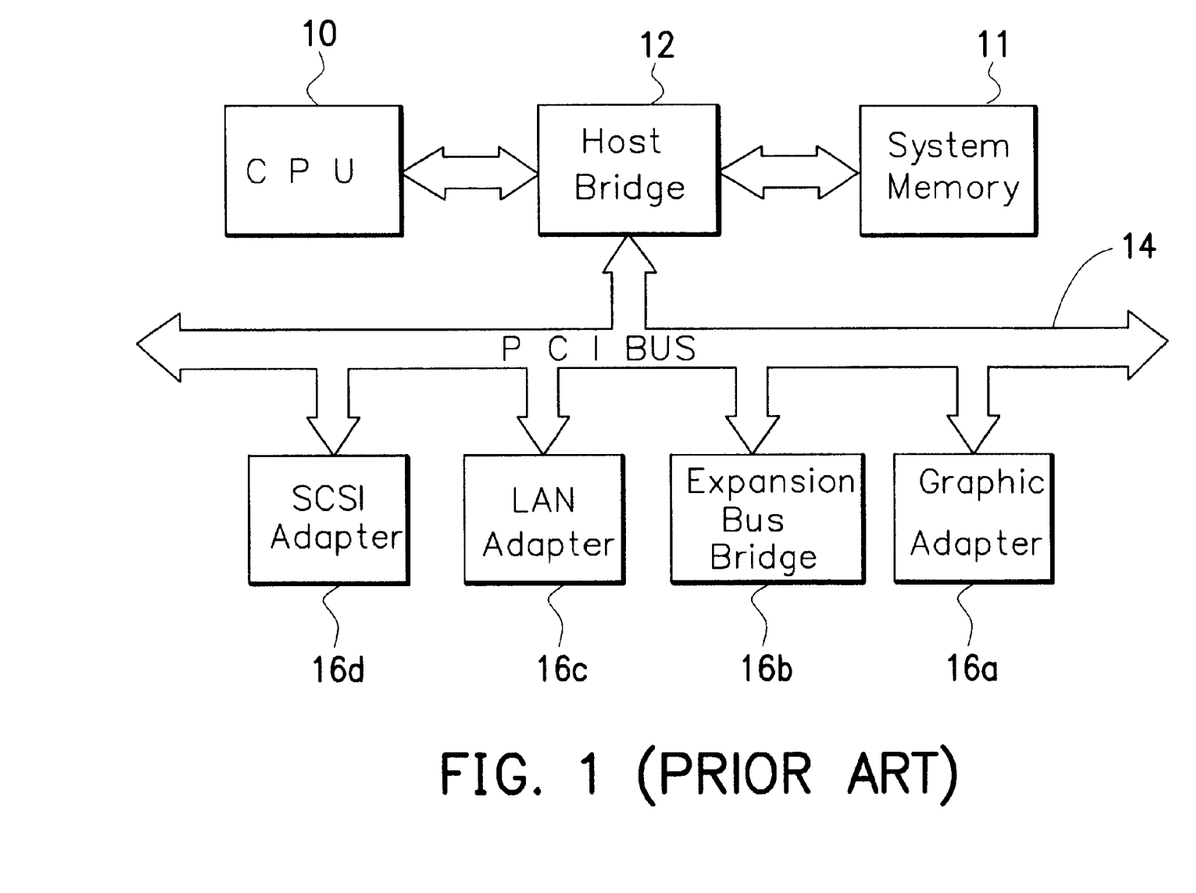
FIG. 1 is a block diagram showing a PCI bus system connecting various components of a conventional computer system.

FIG. 1 shows a PCI bus system connecting various components of a conventional computer system. As shown in FIG. 1, a central processing unit 10 is coupled to the PCI bus 14 via a host bridge 12. The master controller of PCI compatible peripheral devices such as a graphic adapter 16a, an expansion bus bridge 16b, a LAN adapter 16c and a SCSI host bus adapter 16d are also coupled to the PCI bus 14. Each master controller sends out a request (RST) signal demanding the use of the PCI bus 14. The host bridge 12 serves as an arbitrator that sends out grant (GNT) signals to the controller when the PCI bus 14 is available.

Data transmission between PCI compatible devices (such as the master controllers or the north bridge) is controlled by a few interface control signals. A cycle frame (FRAME) is issued from an initiator (the master controller or the north bridge), indicates the initialization of a data access operation and the duration therein. As soon as the FRAME signal is sent out, data transaction via the PCI bus begins. A low FRAME signal indicates data transmission is in progress. After the initiation of data transaction, the address bus AD sends out a valid address during the address cycle. In the meantime, the command/byte enable (CBE[3:0]) signal lines send out a valid bus command (according to PCI specification) for informing the target device the data transaction mode demanded by the initiator. In general, the four bits of the command/byte enable signal lines code up to a maximum of 16 different commands, and each command is defined in detail in the PCI specification. After the effective address is sent out, a data cycle begins in which data is transmitted through the address bus AD. In the meantime, byte enable signals are sent so that data can be transmitted. When the transmission of FRAME signal stops, the last set of data is transmitted and there is no more transaction. An initiator ready (IRDY) signal and a target ready (TRDY) signal are used in couple by the system for displaying the readiness of the initiating device and the target device in data transaction. In a data read operation, the IRDY signal indicates that the initiator is ready to receive the demanded data. In a data write operation, the TRDY signal indicates that the target device is ready to receive the demanded data. A stop (STOP) signal is used by the target device to request a termination of data transaction from the initiator.

Figure 2:
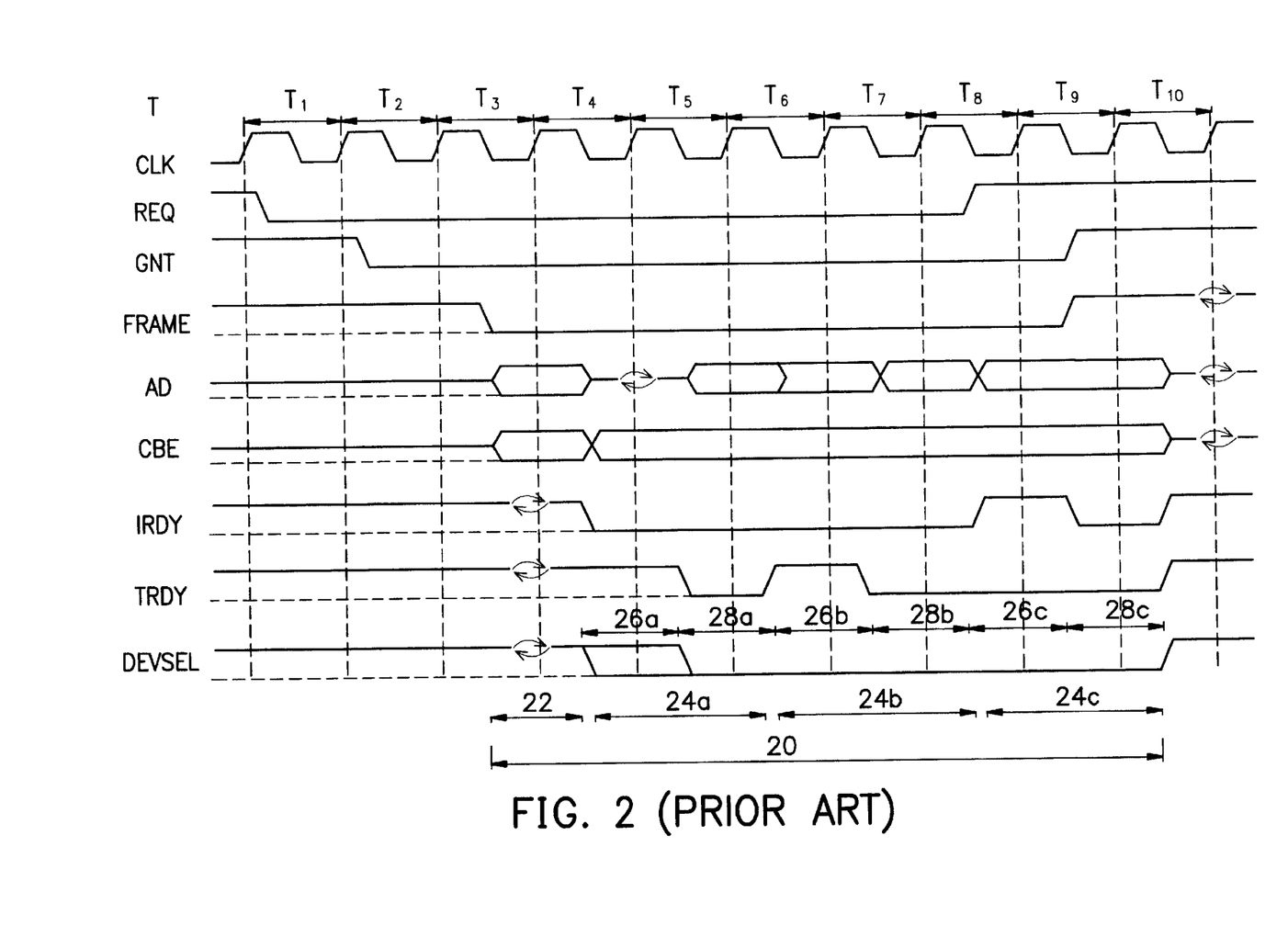
FIG. 2 is a timing diagram showing the various signals in the PCI bus interface during a read operation.

FIG. 2 is a timing diagram showing the various signals in the PCI bus interface during a read operation. The period within which data are transmitted via the PCI bus is known as a bus transaction cycle 20. The bus transaction cycle 20 includes an address cycle 22 and several data cycles, for example, 24a, 24b and 24c. Each data cycle 24a/b/c can be further divided into a wait cycle 26a/b/c and a data transfer cycle 28a/b/c. The following is a brief description of the PCI bus interface during a read operation for illustrating the control signals according to PCI specification.

At cycle T1, an initiator (master) sends a request signal REQ for accessing the PCI bus. At this time, if there is no other device having high priority requesting accessing the PCI bus, then during cycle T2, the main bridge (arbitrator) sends a grant signal GNT for allowing the initiator accesses the PCI bus. During cycle T3, a FRAME signal is sent by the initiator for indicating the start of a data transaction while a start address is put on the address bus AD lines to locate the target device of the transaction. In the meantime, a read command is transmitted through the CBE lines. After the delivery of the read command, a byte enable signal is put on the CBE lines. The byte enable signals are sent throughout the data cycles (including 24a, 24b and 24c). During cycle T4, the initiator submits an initiator ready signal IRDY indicating readiness for data transmission. However, the target device is still not ready yet. Hence, the target device keeps preparing data while the initiator idles in the wait cycle 26a of the data cycle 24a. During cycle T5, the target device already prepares all the necessary data for transmission, thereby sending out a target ready TRDY signal. Therefore, in data cycle 28a, both IRDY and TRDY are out and the initiator begins to read data from the target device. During cycle T6, the target device no longer issues the target ready TRDY signal, and the transmission of the first set of data is completed. Meanwhile, another set of data is prepared by the target device. Again, the initiator idles in a wait cycle 26b of the data cycle 24b. During cycle T7, the target ready TRDY signal is again issued for indicating the second set of data is ready. In the cycle 28b, both the IRDY and TRDY are issued and the initiator begins to read data from the target device. If the initiator has insufficient time to read all the data from the target device, the IRDY signal terminates. Since the TRDY signal is still out, the wait cycle 26c is activated by the initiator. As soon as the initiator is ready again as in cycle T9, the IRDY signal is re-issued. The initiator reads data from the target device during data transfer cycle 28c when both IRDY and TRDY signals are issued, and thereby a single read operation is completed.

To carry out proper data transaction according to the conventional PCI specification, complicated control signals, wait states, arbitration steps must be used. Typically, about 45 to 50 signaling pins are required according to the PCI specification. In general, complicated procedure is unnecessary for internal transaction between control chipsets. Hence, to speed up internal transaction between control chipsets, a simplified transaction method that adheres to the conventional PCI specification is needed.

However, transactions between control chips of a PC generally do not use all of the complicated functions provided by the PCI specification. The performance between the control chips is usually decreased by unnecessary procedure. As the device integration increases, the control chips may be integrated to a single chip and more functions are provided. For example, the CPU, north bridge and the south bridge are formed integrally into a single chip. Therefore, pins of the chip package become more important. In order to increase the seed of transactions between the control chips, a simplified and specific specification for use between the control chips is required.

SUMMARY OF THE INVENTION

The present invention provides a control chips, data transaction method between control chips within the control chipset and a bus arbitration method between the control chips within the control chipset. Therefore, the performance of the control chipset increases, and types and numbers of signal lines between the control chips are reduced.

The present invention provides a data transaction method between control chips. The data or commands are continuously transmitted without any waiting, stop or retry.

The present invention provides a data transaction method between control chips within the control chipset, wherein cycles for waiting stop/retry are reduced.

The present invention provides a bus arbitration method between control chips which reduces arbitration and grant time.

According to the present invention, data buffers of the control chips of the control chipset have fixed size and amount. In addition, read/write acknowledge commands are asserted in sequence according to read/write commands, by which the control chips can detect the status of the buffers within other control chips. When a control chip asserts a command, the corresponding data must be prepared in advance. Therefore, the signal line for providing the waiting status, data transaction cycle and stop/retry protocol can be omitted. Accordingly, commands or data can be continuously transmitted without waiting, stop or retry, and the performance is increased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The present invention provides a transaction method and an arbitration method between control chipsets or between chipsets within a control chipset, which can promote the efficiency of data transaction between the control chipsets. Namely, the bus transaction process between control chipsets is simplified. The control chipsets, for example, a north bridge and a south bridge within a computer system are used as an example for describing the preferred embodiment according to the present invention. As defined in the conventional PCI specification, 45 command signal lines are required for communicating between the south bridge and the north bridge. However, in the preferred embodiment of the present invention, only 16 signals, i.e., 16 signal lines are required. The newly defined 16 commands of the present invention are named as VLINK commands.

Figure 3:
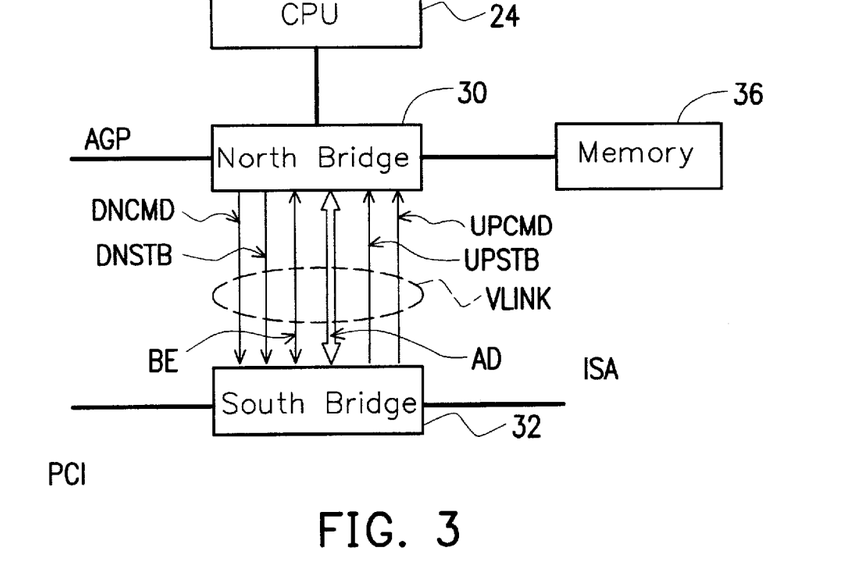
FIG. 3 is a block diagram showing the control signals used in data transaction between control chipsets inside a control chipset module according to the embodiment of this invention.

Referring to FIG. 3 and Table 1. FIG. 3 schematically shows a block diagram of a control chipset according to a preferred embodiment of the present invention, in which control signal lines between a north bridge and a south bridge arc illustrated in detail. In Table 1, each of the control signal lines shown in FIG. 3 is listed. The control chipset, for example, comprises the south bridge 30 and the north bridge 32. In the present invention, the signal lines (signals) between the south bridge 30 and the north bridge 32 are reduced from 45 signal lines (signals) to 16 signal lines (signals). Therefore, other pins can be used for other purposes for promoting the functions of the chipset.

In the present invention, the 16 signals include: clock signal (CLK), AD[7:0], DNSTB, UPSTB, DNCMD, BE, VREF and COMP. As shown in FIG. 3 and Table 1, the data and address bus (AD bus) defined by the original PCI specification is reserved but reduced to 8 bidirectional signal lines. CBE, FRAME, IRDY, TRDY, STOP, DEVSEL, REQ an GNT signal lines are simplified to a bidirectional byte enable (BE) signal line, a uplink command signal line UPCMD and a uplink strobe signal line UPSTB both driven by the south bridge, and a downlink command signal line DNCMD and a downlink strobe signal line DNSTB both driven by the north bridge. The VREF signal refers to a reference voltage and the COMP signal refers to an impedance comparison. The CLK signal is a 66 MHz clock signal, initiated by neither the north bridge nor the south bridge. Each of the north bridge 32 and the south bridge 30 drives an independent command signal line, DNCMD and UPCMD which both can assert bus commands. In addition, if a bus command is asserted and the bus authority is obtained by somecontrol chip, the control chip can send addresses on the AD bus and data length corresponding to the current command on the BE signal line, or send data on the AD bus and byte enable signal for the data on the BE signal line.

TABLE 1

| Signals | Initiated By | Remark |
| --- | --- | --- |
| CLK | | 66 MHz clock signal |
| DNSTB | North Bridge | Down Strobe |
| UPSTB | South Bridge | Up Strobe |
| DNCMD | North Bridge | Down Command |
| UPCMD | South Bridge | Up Command |
| BE | North Bridge/South Bridge | Byte Enable |
| AD [7:0] | North Bridge/South Bridge | Address/Data bus |
| VREF | | Reference Voltage |
| COMP | | Impedance Comparison |

Figure 4:
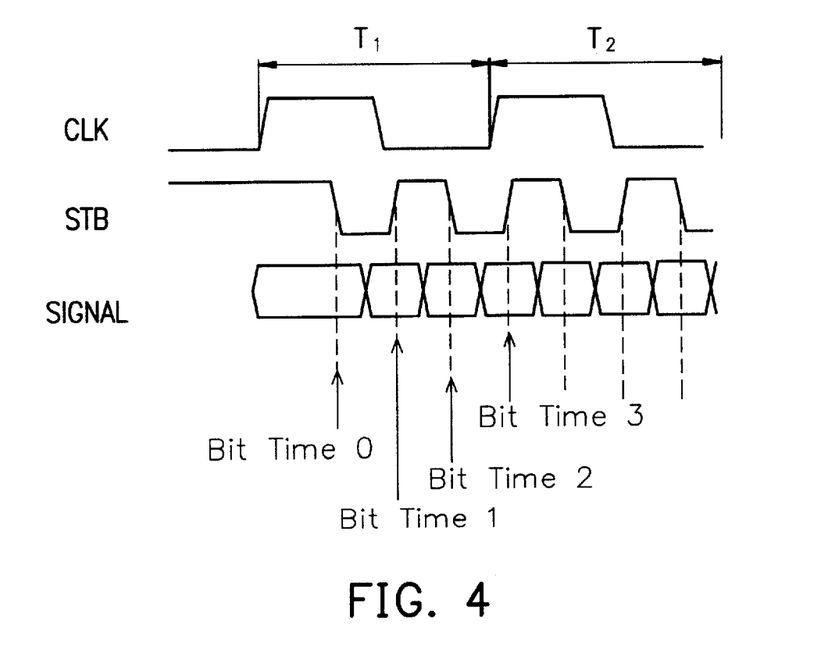
FIG. 4 is a timing diagram showing a clock cycle containing four bit times for command coding according to this invention.

FIG. 4 illustrates a timing relationship between a bus clock signal (CLK), a strobe signal (STB) and bit times of data lines for transferring data according to the present invention. As shown in FIG. 4, one clock period is equal to two strobe clock periods. Namely, the frequency of the uplink strobe signal/downlink strobe signal is twice the frequency of the bus clock signal. There are four bit times 0~3 defined by the rising and falling edges of the strobe signal. Therefore, 4 bit data are obtained by using the four bit times 0~3 on each data line and bus commands are encoded from the four bit times 0~3. Accordingly, 32 bit data are obtained using 8 data lines during each clock period, which is equivalent to that data are transferred using 32 data lines in the conventional PCI specification. In addition, if the BE signal line transmits a data length, 1~16 (4 bits) data length information are obtained within one clock period.

A various types of data transactions are defined by the uplink command UPCMD and the downlink command DNCMD. The uplink command UPCMD driven by the south bridge comprises a read acknowledge command (NB to SB) C2PRA, a write acknowledge command (NB to SB) C2PWA, a read command P2CR (SB to NB), and a write command (SB to NB) P2CW etc. The relations between uplink commands and the bit time encoding are listed in Table 2. The request signal REQ is asserted at bit time 0, and not overlapped with the other bus commands. Therefore, the REQ signal can be sent at any time, and even at the same clock period which a bus command is asserted. The downlink command DNCMD driven by the north bridge comprises a input/output read command (NB to SB) C2PIOR, a memory read command (NB to SB) C2PMR, a input/output write command (NB to SB) C2PIOW, a memory write command (NB to SB) C2PMW, a read acknowledge command (SB to NB) P2CRA, and a write acknowledge command (SB to NB) P2CWA etc. The relations between downlink commands and the bit time encoding are listed in Table 3. No grant signal GNT is defined or needed in the present invention.

The commands asserted by the north bridge and the south bridge are corresponding to each other. When the south bridge sequentially asserts a number of P2CR and/or P2CW, the north bridge must sequentially assert the corresponding P2CRA and/or P2CWA commands in response to the P2CR and/or P2CW commands. Similarly, when the north bridge sequentially asserts a number of C2PIOR, C2PMR, C2PIOW and C2PMW commands, the south bridge must sequentially assert the corresponding C2PRA and C2PWA commands in response to the P2CR and/or P2CW commands. In addition, as described in the preferred embodiment, data corresponding to each command asserted by the control chip must be prepared by the north bridge/south bridge in advance. For example, data written into the memory must be ready before the south bridge asserts a P2CW command and data for transferring the read data from the memory to the south bridge must be ready before the north bridge asserts a P2CRA command. Accordingly, there is no interrupting in data transmission and no wait status is existed.

TABLE 2

(uplink command UPCMD)

| Bit Time 0 REQ | Bit Time 1 PMSTR | Bit Time 2 MIO | Bit Time 3 WR | Explanation |
|---|---|---|---|---|
| — | 0 | — | 0 | C2PRA |
| — | 0 | — | 1 | C2PWA |
| — | 0 | 0 | 0 | P2CR |
| — | 0 | 0 | 1 | P2CW |
| — | 1 | 1 | 0 | NOP |
| 0 | — | — | — | REQ |

TABLE 3

(downlink command DNCMD)

| Bit Time 0 | Bit Time 1 PMSTR | Bit Time 2 MIO | Bit Time 3 WR | Explanation |
|---|---|---|---|---|
| — | 0 | 0 | 0 | C2PIOR |
| — | 0 | 0 | 1 | C2PIOW |
| — | 0 | 1 | 0 | C2PMR |
| — | 0 | 1 | 1 | C2PMW |
| — | 1 | 0 | 0 | P2CRA |
| — | 1 | 0 | 1 | P2CWA |
| — | 1 | 1 | 1 | NOP |

Figure 5A:
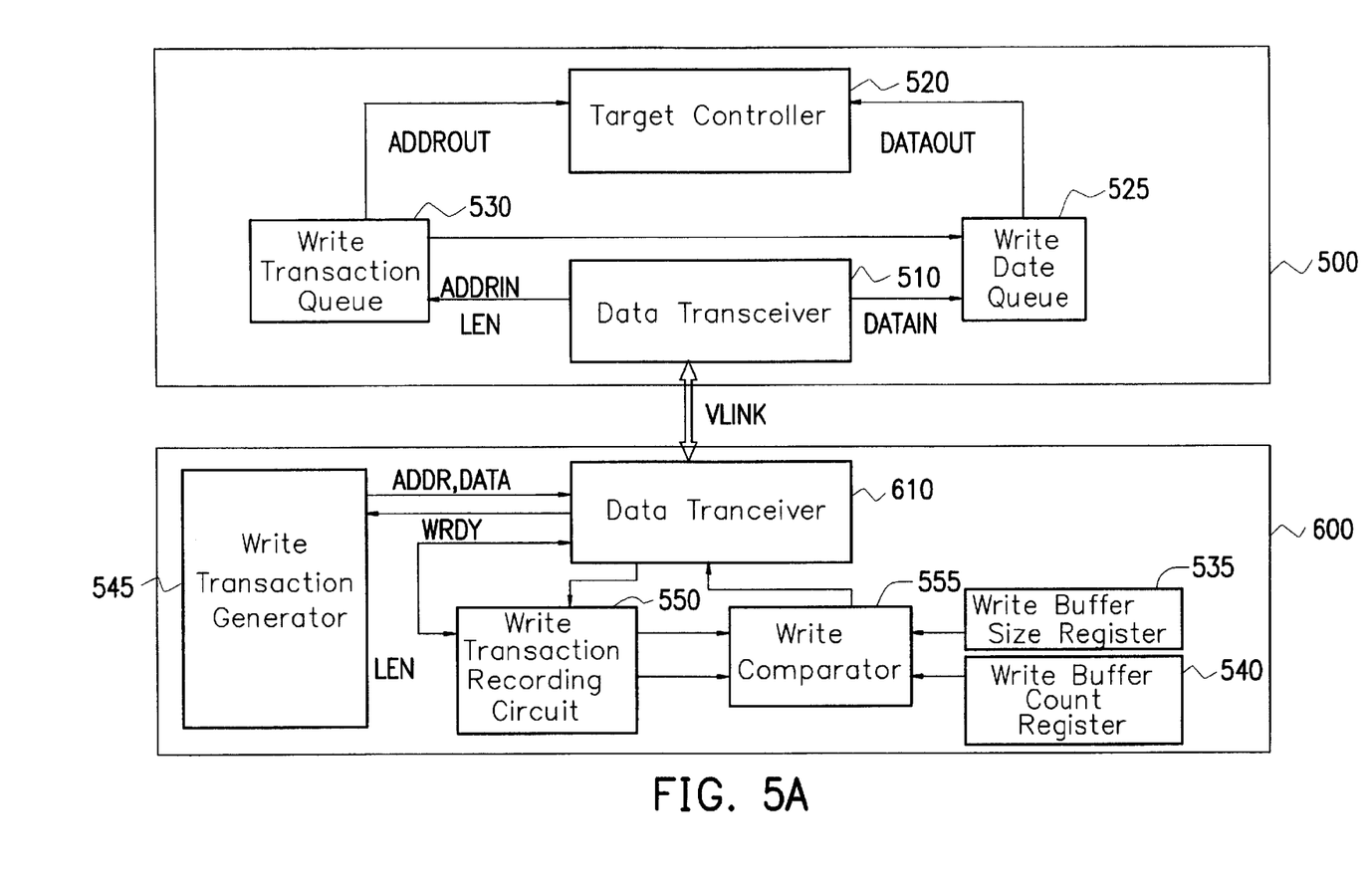
FIG. 5A schematically illustrates a block diagram of a control chipset according to one preferred embodiment for write transactions according to the present invention.

FIG. 5A schematically illustrates a block diagram of a control chipset for write transactions according to one preferred embodiment of the present invention. The control chipset, for example, comprises a first control chip and a second control chip. In general, the first and the second control chips may be the north bridge 500 and the south bridge 600. The first control chip (north bridge) 500 and the second control chip (south bridge) 600 are coupled by a special designed bus, VLINK. The north bridge 500 comprises a data transceiver 510, a target controller 520 (for example, a memory controller), a write data queue 525 and a write transaction queue 540. The south bridge 600 comprises a data transceiver 610, a write buffer size register 535, a write buffer counting register 540, a write transaction generator 545, a write transaction recording queue circuit 550 and a write comparator 555.

The data transceiver 510 which meetsthe VLINK specification of the present invention is directly coupled to the VLINK bus. Through the VLINK bus, the data transceiver 510 can receive and transmit data to complete a number of write transactions.

One write transaction is defined as that the south bridge 600 sends a P2CW command and data corresponding to the P2CW command and then the north bridge 500 asserts a P2CWA command for responding the P2CW command. The write transaction queue 530 temporally stores respective data length and write addresses of all write transactions in sequence. The depth of the write transaction queue 530 determines a total number of write transactions allowed by the north bridge 500. The write data queue 525 stores all the post write data from the south bridge 600. The depth of the write data queue determines the maximum number of the write data allowed by the north bridge 500. After the target controller 520 sends data to a target, for example a external memory, data according to a write address and data length first stored in the write transaction queue 530 and data stored in the write data queue 525 corresponding to the write address and data length. The first data transceiver 510 sends a write acknowledge signal (the P2CWA command) to inform the south bridge 600 that the write transaction is completed and all the write data are in the target device. The corresponding data stored in the write data queue 525 are then released.

The write buffer count register 540 stores the maximum number of the write transactions that the write transaction queue 530 of the north bridge 500 can handle. i.e., its depth. The write buffer size register 535 stores the maximum number of the write data that the write data queue 525 of the north bridge 500 can handle, i.e., its depth. For example, the write buffer count register 540 is set to 4 and the write buffer size register 535 is set to 16. Therefore, the south bridge 600 knows that the north bridge 500 can accept up to 4 write transactions and the maximum number of data of the write transactions can not exceed 16DW. The two parameters, the maximum number of the write transactions and data can be setup by BIOS (basic input output system) configuration during booting.

The data transceiver 610 coupled to the VLINK bus, receives and transmits data through the VLINK bus to complete all write transactions. When the data transceiver 610 receives a P2CWA command, the data transceiver 610 sends a signal which indicates successful write and buffer release to write transaction recording queue circuit 550 for releasing space that stores data length corresponding to the currently write transaction. When a new data length, a write address and data of next write transaction are generated by the write transaction generator 545, the new data length is then sent to the write transaction recording queue circuit 550.

The write transaction recording circuit 550 is capable of calculating the data numbers allowable in the write data queue 525 and the write transaction numbers allowable in the write transaction queue 530. This is because the write transaction recording circuit 550 sequentially stores the data lengths of all write transactions, and the P2CWA asserted by the north bridge 500 responded in accordance with the sequence of the P2CW commands asserted by the south bridge 600. Therefore, the south bridge 600 can recognize the status of buffers in the queues within the north bridge 500.

The write transaction recording circuit 550 can send the data numbers allowable in the write data queue 525 and the write transaction numbers allowable in the write transaction queue 530 to the write comparator 555. The write comparator 555 then respectively compares the received data with the maximum numbers of the write data stored in the write data buffer size register 535 and the maximum numbers of write transaction stored in the write buffer counting register 540. If the data received by the write comparator 555 is less than the maximum data numbers and the maximum transaction numbers, the write comparator 555 acknowledges the data transceiver 610 to send another information of write transaction. Otherwise, the south bridge 600 cannot sends more write transactions to the north bridge 500.

Figure 5B:
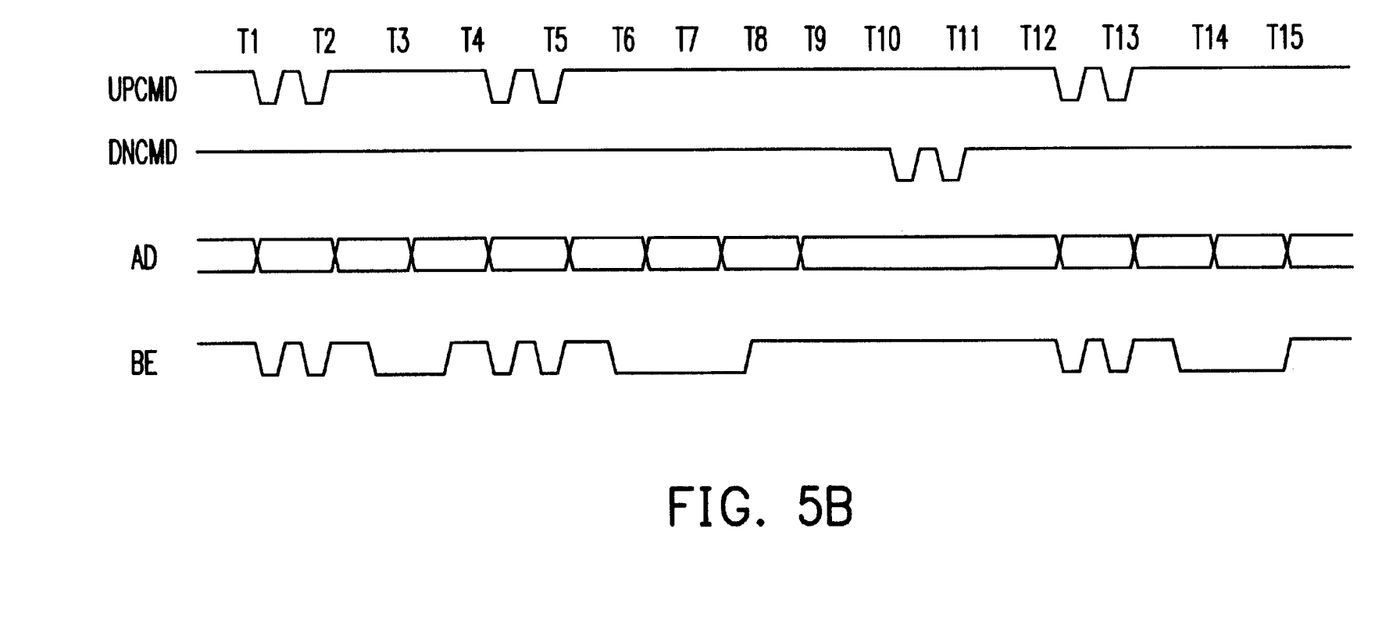
FIG. 5B shows an example of a timing diagram of a write transaction according to the present invention.

FIG. 5B shows an example of a timing diagram of a write transaction according to the present invention. As an example, it is provided that the south bridge 600 gets the authority to use the data bus and begins a first write transaction at T1. The south bridge 600 asserts a write command P2CW on the uplink command signal line UPCMD, a write address ADDR on address/data (AD) bus and a data length LEN=2 (for example) that is to be written on the byte enable (BE) signal line. At period T2, the south bridge 600 sends a first data on the AD bus and BE command of the first data on the BE signal line. At period T3, a second data is sent by the south bridge 600. At the time, an unfinished write transaction still runs in the north bridge 500. The south bridge 600 is capable of recognizing the maximum number of write transaction and the maximum size of write data queue concurrently allowed by the north bridge, therefore the south bridge 600 determines whether the north bridge 500 receives new write transactions or not. If there is still empty space in the write transaction queue 530 and the write data queue 525, the south bridge 600 initiates a second write transaction at period T4. At the time, there are two unfinished write transactions within the north bridge 500. At period T9, the south bridge determines whether a third write transaction can be initiated or not. If the south bridge detects that initiating a third write transaction causes the overflows of the write transaction queue 530 or the write data queue 525, the south bridge then does not initiate the third transaction at periodT9. When the north bridge 500 writes data corresponding to the first write transaction into the memory, the north bridge 500 asserts a write acknowledge command through the downlink signal line DNCMD at periodT9 to acknowledge the south bridge 600 that the first write transaction (length LEN=2) has finished. Then the south bridge 600 can detect that one space of the write transaction queue 530 and two spaces of the write data queue 525 of the north bridge 500 are released. Namely, the south bridge 600 knows that the first write transaction has been finished after the south bridge 600 receives the write acknowledge command. The spaces of the write transaction queue 530 and the write data queue 525 corresponding to the first write transaction are released. Then the south bridge 600 determines that the north bridge 500 can handle the third write transaction. And then, the third write transaction begins at periodT12.

Figure 6A:
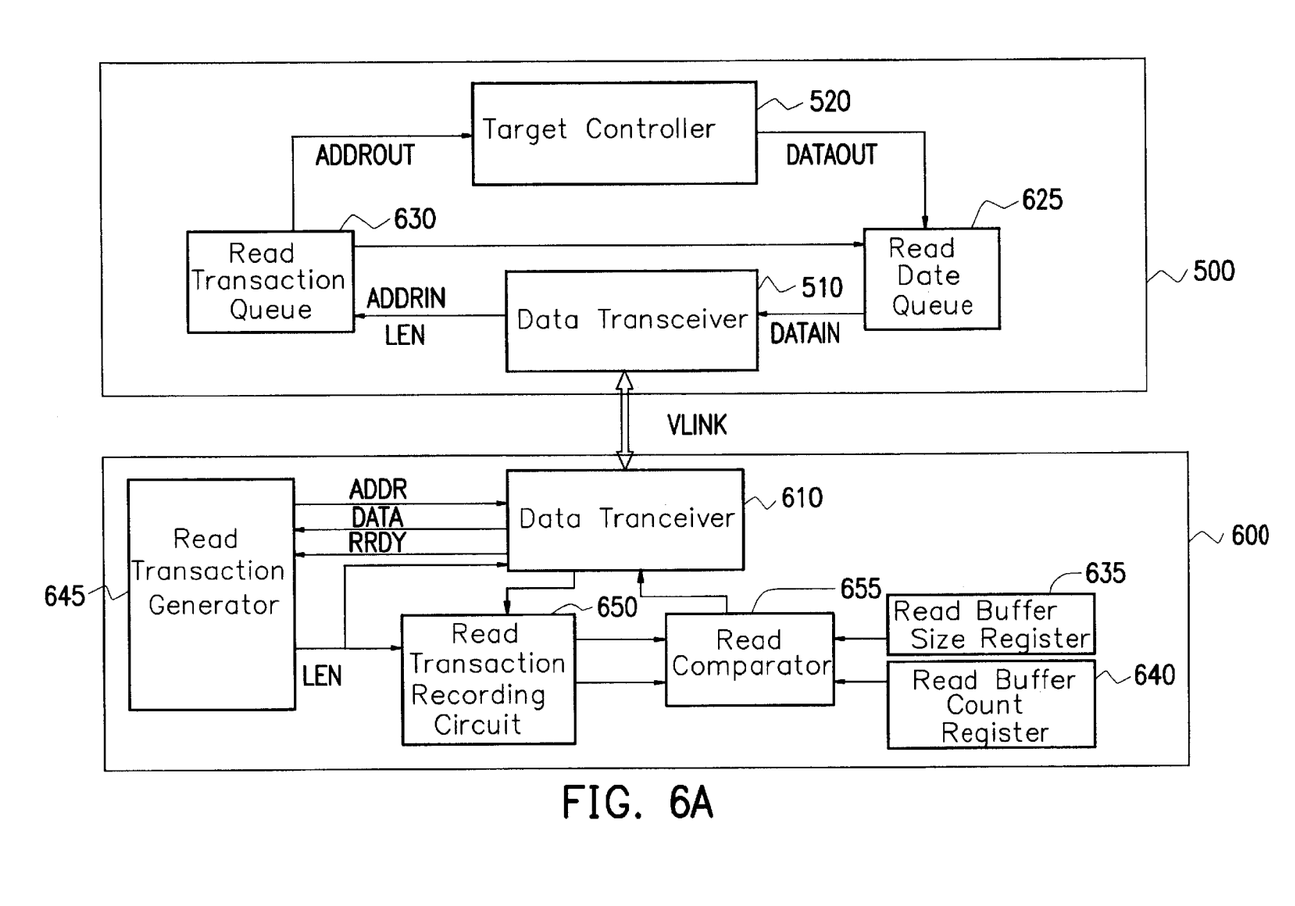
FIG. 6A schematically illustrates a block diagram of a control chipset according to one preferred embodiment for read transactions according to the present invention.

FIG. 6A schematically illustrates a block diagram of a control chipset for read transactions according to the preferred embodiment of the present invention. The control chipset, for example, comprises a first control chip and a second control chip. In general, the first and the second control chips may be the north bridge 500 and the south bridge 600. The first control chip (north bridge) 500 and the second control chip (south bridge) 600 are coupled by a special designed bus, VLINK. The north bridge 500 comprises a data transceiver 510, target controller 520 (for example, a memory controller), read data queue 625 and a read transaction queue 630. The south bridge 600 comprises a data transceiver 610, a read buffer size register 635, a read buffer counting register 640, a read transaction generator 645, a read transaction recording circuit 650 and a read comparator 655.

The data transceiver 510 which meets the VLINK specification of the present invention is directly coupled to the VLINK bus. Through the VLINK bus, the data transceiver 510 can receive and transmit data to complete read transactions. One read transaction is defined as that the south bridge 600 sends a P2CR command and then the north bridge 500 sends a P2CRA command and corresponding data for responding the P2CR command. The read transaction queue 630 temporally stores data lengths and read addresses of all read transactions in sequence. The depth of the read transaction queue 630 determines a total number of read transactions allowed by the north bridge 500. The read data queue 625 stores all the read data from the target controller 520, which will be sent to the south bridge 600 later. The depth of the read data queue determines the maximum number of read data allowed by the north bridge 500. The target controller 520 reads data from a target, for example an external memory, according to a read address and a data length that are first stored in the read transaction queue 630. The first data transceiver 510 sends a read acknowledge signal (the P2CRA command). At the same time, the corresponding data stored in the read data queue 625 are sent to the south bridge 600 through the VLINK bus and the released space can store another data for the next read transaction.

The read buffer count register 640 and the read buffer size register 635 of the south bridge 600 respectively store the maximum number of read transactions the read transaction queue 625 can handle and the maximum number of data the read data queue 625 can store. For example, the maximum number of read transactions the read transaction queue 630 can handle (the read buffer count) is 4 and the maximum number of data the read data queue 625 can store (the read buffer size) is 16DW. The two parameters, the read buffer size and the read buffer count, can be setup by BIOS (basic input output system) configuration during booting or fixed during chipset design.

The data transceiver 610 is coupled to the VLINK bus for receiving and transmitting data through the VLINK bus to complete all read transactions. When the data transceiver 610 receives a P2CRA command, the data transceiver 610 sends a signal which indicates successful read and buffer release to read transaction recording circuit 650 for releasing space that stores the data length of the currently corresponding read transaction. When a new data length and a read address of the next read transaction are generated by the read transaction generator 645, the new data length is then sent to the read transaction recording circuit 650.

The read transaction recording queue circuit 650 is capable of calculating the data numbers allowable in the read data queue 630 and the read transaction numbers allowable in the read transaction queue 625. This is because the read transaction recording queue circuit 650 sequentially stores the data lengths of all read transactions, and the P2CRA asserted by the north bridge 500 is responded in accordance with the sequence of the P2CR commands asserted by the south bridge 600. Therefore, the south bridge 600 can recognize the status of buffers in the queues within the north bridge 500.

The read transaction recording circuit 650 can send the data numbers allowable in the read data queue 630 and the read transaction numbers allowable in the read transaction queue 625 to the read comparator 655. The read comparator 655 then respectively compares the received data with the maximum data numbers of the read data queue 625 stored in the read data buffer size register 635 and the maximum read transaction numbers of the read transaction queue 630 stored in the read buffer count register 640. If the data received by the read comparator 655 is less than the maximum data numbers and the maximum read transaction numbers, the read comparator 655 acknowledges the data transceiver 610 that it is able to send another information of read transaction.

Figure 6B:
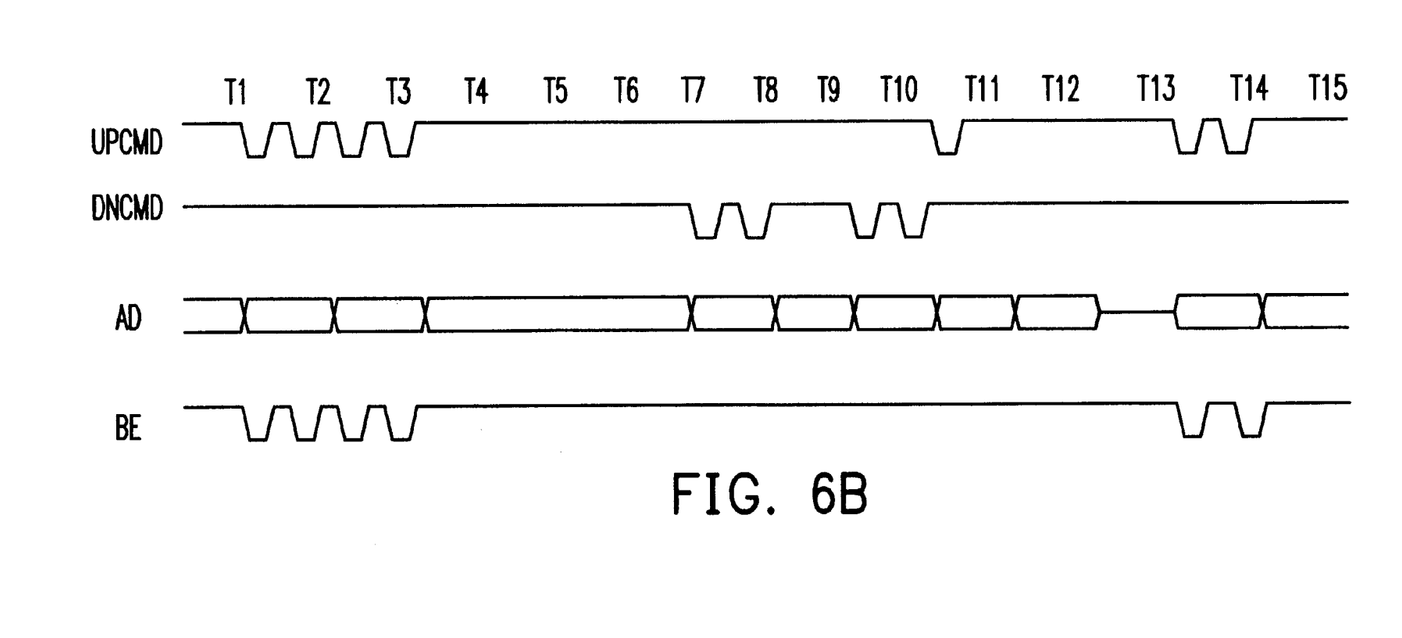
FIG. 6B shows an example of a timing diagram of a read transaction according to the present invention.

FIG. 6B shows an example of a timing diagram of a read transaction according to the present invention. As an example, it provides first assume that the south bridge 600 gets the authority to use the data bus and begins a first read transaction at T1. The south bridge 600 asserts a read command P2CR on the uplink command signal line UPCMD, a read address ADDR on address/data (AD) bus and sends a data length LEN=2 (for example) that is to be read on the byte enable (BE) signal line. At this time, there is an unfinished read transaction within the north bridge 500. The south bridge 600 can detect the number of read transactions and the size of data queues allowed by the north bridge, and therefore, the south bridge can determine whether the north bridge can receive new read transactions or not. If there is still empty space in the read transaction queue 630 and read data queue 625, the south bridge 600 can initiate a second read transaction at periodT2 (LEN=3, for example). At the time, there are two unfinished read transactions within the north bridge 500. At period T3, the south bridge 600 determines that initiating a third read transaction causes overflow of the read transaction queue 630 or the read data queue 625, and then the south bridge does not initiate the third transaction at period T3. When the north bridge 500 gets the data corresponding to the first read transaction from a memory controller 520 and then stores the data in the read data queue 625, the north bridge 500 asserts a read acknowledge command to send data to the south bridge 600. At period T7, the north bridge gets the authority to use the bus, and then sends the read acknowledge command P2CRA on the downlink command signal line DNCMD and data of the first double word of the first read transaction on the AD bus. At period T8, the second double word of the first read transaction is sent out. At this time, the south bridge 600 detects that the spaces of read transaction queue 630 and the read data queue 625 corresponding to the first read transaction are released. Then, the south bridge 600 determines whether a third read transaction can be initiated or not. The south bridge 600 has to get the authority to use the VLINK bus before initiating the third read transaction. Therefore, the south bridge 600 asserts a request command REQ through the uplink command signal line UPCMD at period T10 to request the authority of use of the VLINK bus. During the period T9–T10–T11, the north bridge 500 sends the read acknowledge command to send the data of the second read transaction to the south bridge 600, and then the south bridge 600 gets the authority to use the bus at period T13. Then, the third read transaction is initiated by the south bridge 600.

The north bridge and south bridge are the first control chipset and the second control chipset respectively and the commands are sent by the south bridge to control the north bridge to read or write data. However, to those skilled in the art, both the north and south bridges can have the corresponding structures, and therefore, the commands are not limited to be sent by the south bridge or the north bridge. Namely, the south and the north bridges can be the first control chipset and the second control chipset respectively.

The descriptions corresponding to FIGS. 5A, 5B and 6A 6B are just examples, which are not used for limiting the scope of the present invention. The features of the present invention comprises at least:

1. When a write or read transaction is initiated, in addition to the addresses and command, the data length corresponding to the write or read transaction is also sent, therefore, no FRAME signal is required to inform the termination of the data transaction.
2. When there are a number of write or read transactions to be executed, a number of write or read acknowledge commands corresponding to the write or read transaction are sequentially sent and corresponded, therefore, the chipsets can know the status of the internal queues of chipsets each other.
3. The application is not limited to the north bridge and south bridge of a PC, but also used for any data transaction between two chips.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A control chipset, comprising:
    a bus;
    a first control chip, comprising:
        a first data transceiver, coupled to the bus for receiving and transmitting data signals to complete read/write transactions;
        a read/write data queue, coupling to the first data transceiver for temporally storing data of the read/write transactions;
        a read/write transaction queue, coupling to the first data transceiver for temporally storing data lengths and addresses of data of the read/write transactions;

a target controller, coupling to the read/write data queue and the read/write transaction queue, wherein the target controller send data to a target device according to read/write addresses stored in the read/write transaction queue and data stored in the read/write data queue corresponding to the first stored read/write transaction; then the first data transceiver asserts a read/write acknowledge signal; and the read/write addresses and the read/write data queue corresponding to the read/write addresses are released; and a second control chip, coupled to the bus, comprising:
a read/write buffer size register, for memorizing a maximum number of data allowed in the read/write data queue;
a read/write buffer counting register, for memorizing a maximum number of transactions allowed in the read/write transaction queue;
a second data transceiver, coupling to the bus for receiving and transmitting data signals through the bus to complete the read/write transactions, and asserting a releasing buffer signal when receiving the read/write acknowledge signal;
a read/write transaction generator, coupling to the second data transceiver for generating data length of the read/write transactions, the read/write addresses and data;
a read/write recording circuit, coupling to the second data transceiver and the read/write transaction generator, for temporally storing data length of the read/write transactions, and calculating an usable data number of the read/write data queue and an allowable transaction number in the read/write transaction queue according to the releasing buffer signal; and
a read/write comparator, coupling to the second data transceiver, the read/write buffer size register, the read/write buffer counting register and the read/write recording queue circuit, for informing the second data transceiver of data corresponding to a next read/write transaction.

2. The control chipset of claim 1, wherein the bus comprises a reference voltage signal line, an impedance comparison signal line, an address/data bus, a length/byte enable signal line, an uplink command signal line, an uplink strobe signal line, a downlink command signal line, a downlink strobe signal line and a clock signal line.

3. The control chipset of claim 1, wherein frequencies of the uplink strobe signal line and the downlink strobe signal line are both twice the frequency of the clock signal.

4. The control chip of claim 1, wherein the first and the second control chips are the north bridge and the south bridge respectively; the target controller is a memory controller and the bus is a VLINK bus.

5. A control chipset, comprising:
a first chip comprising a transaction queue with depth n and a data queue with depth m, wherein n is a total number of transactions allowed by the first chip, the m is a maximum number of the data allowed to access by the first chip); and
a second chip, for recording status of the transaction queue and the data queue, wherein a next transaction issued by the second chip is initiated if an amount of the outstanding transaction is lower than n and an amount of data is lower than m.

6. The control chip of claim 5, wherein the first and the second are north and south bridges of a computer mother board respectively.

7. A signal transmission device for connecting between chips, comprising:
a downlink command signal line (DNCMD) for defining data transaction types of a plurality of downlink commands;
a downlink strobe signal line (DNSTB) for strobing the downlink command signal line;
an uplink command signal line (UPCMD) for defining data transaction types of a plurality of uplink commands;
an uplink strobe signal line (UPSTB) for strobing the uplink command signal line;
a byte enable signal line (BE) being a bidirectional byte enable signal line;
an address/data line (AD) for asserting an address/data signal; and
a clock signal line (CLK) for providing an operational clock signal.

8. The device of claim 7, wherein the downlink strobe signal line and the uplink strobe signal line are unidirectional.

9. The device of claim 7, wherein frequencies of the downlink strobe signal line and the uplink strobe signal line are both twice the frequency of the operational clock signal.

10. A data transaction method for completing a plurality of read/write transactions between a first device and a second device connected by a bus, comprising steps of:
providing a maximum number for executing the read/write transactions and a maximum data length of data transceived by each of the read/write transactions;
performing a read/write transaction when a read/write address corresponding to the read/write transaction is asserted to read/write data corresponding to the read/write transaction which is not exceeded the maximum data length of data;
asserting a read/write acknowledge signal;
releasing the read/write address corresponding to the read/write transaction and the data stored in the read/write data queue;
generating a data length of a next read/write transaction, read/write addresses and corresponding data;
calculating a data buffer number of the read/write data and a read/write transaction number of the read/write transaction according to the read/write acknowledge signal; and
determining the data length, the read/write transaction, the read/write addresses and the corresponding data of the next read/write transaction according to the data buffer number, the read/write transaction number, the total transaction number of the read/write transaction and the maximum data number of the read/write data.

* * * * *